June 23, 1970 T. O. PAINE 3,517,109

ACTING ADMINISTRATOR OF THE NATIONAL AERONAUTICS AND SPACE ADMINISTRATION

RADIO-FREQUENCY SHIELDED ENCLOSURE

Filed Dec. 12, 1968

INVENTOR
HINLAND YOUNG

BY: [signature]
G.J. Porter
ATTORNEYS 3,517,109

RADIO-FREQUENCY SHIELDED ENCLOSURE

T. O. Paine, Acting Administrator of the National Aeronautics and Space Administration, with respect to an invention of Hinland Young, Fountain Valley, Calif.

Filed Dec. 12, 1968, Ser. No. 783,378
Int. Cl. H05k *9/00*
U.S. Cl. 174—35 2 Claims

ABSTRACT OF THE DISCLOSURE

A method and apparatus for improvement of radio frequency shielding of enclosures by bowing of instrument panels to overcome the natural tendency of the panels to bow outward between the points of attachment along their sides. Tapered shims are inserted behind the sides of a panel covering an enclosure opening, to mechanically bow the panel and to contain electro-magnetic waves, at the sides of the panel. When the attaching bolts are tightened the convex inside surface of the bowed panel exerts a force along the top and bottom of the panel against a radio frequency interference gasket, which in turn exerts a counter force against the panel. These opposing forces straighten the bow in the panel so as to cause a portion of the panel touching the chassis to form a planar surface exerting uniform contact pressure on the radio frequency interference gasket, along the top and bottom of the enclosure opening.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Field of the invention

This invention relates to radio-frequency shielded enclosures and more particularly to a method and apparatus for bowing of instrument panels in order to improve the radio-frequency shielding of an enclosure.

Description of the prior art

Radio frequency interference (RFI) has been a substantial problem since Marconi sent the first message over his "wireless." As radio communications developed, new problems of shielding to combat RFI also developed. Problems with RFI, also called electro-magnetic interference or EMI, increased as radio technology continually progressed into higher and higher frequency systems. One system would interfere with another system and one component with another component until a point was reached where a solution to RFI problems had to be found. Therefore, millions of dollars have been spent in recent years on research, trying to reduce the problem. One conclusion that has been reached as a result of this research is that RFI should be contained at least within a sub-system of a major system. By so doing, one subsystem can be kept from interfering with another subsystem. The containment of RFI within each subsystem may best be accomplished by housing each subsystem in an individual package or chassis and electrically isolating each such chassis from every other chassis by RFI shielding.

One form of RFI shielding known in the prior art is a wire mesh used to prevent electro-magnetic leakage between joining surfaces, through ventilating systems, and through ports for electrical connections. In the forming of shielded joints between two surfaces, problems arise because of the non-uniform seals made between surfaces by the wire mesh or RFI gasket. Most panels or enclosures made of thin aluminum or steel tend to form an arc between the points where they are fastened. As the two surfaces are forced against the RFI gasket by means of bolts, screws, clamps, etc., the surfaces will make a better electro-magnetic isolation contact at the point where the force is applied and tend to bend outward at other points. The result is a non-uniform electro-magnetic isolation between the surfaces. Electro-magnetic radiation is almost totally eliminated at points where the panel is attached to the container. However, at points where the panel is *not* attached, electro-magnetic waves will pass because of the lack of a uniform force against the RFI gasket.

SUMMARY OF THE INVENTION

Accordingly it is an object of this invention to provide an improved method and apparatus for radio-frequency shielding of instrument enclosures.

Still another object of this invention is to provide an improved method and apparatus for radio-frequency shielding of instrument enclosures, which will prevent the bowing out of instrument panels attached to the said enclosures.

Yet another object of this invention is to provide an improved method and apparatus for radio-frequency shielding of instrument enclosures which will not materially affect the cost of manufacture or the thickness or weight of the instrument panels attached to the enclosure.

These and other objects are accomplished in the present invention which includes a method of radio-frequency shielding of instrument enclosures. First, an inward bow is set into an outer enclosure panel. Electro-magnetic isolation material is then positioned around the circumference of one side of the panel. Lastly, the panel is attached to the chassis at a plurality of points along the sides of the panel so as to cause the panel to form a surface exerting uniform pressure against the enclosure. The improved radio-frequency shielded enclosure comprises a chassis, a panel, tapered shims for bowing the panel, attaching means to connect the panel to the chassis, and electro-magnetic isolation material inserted between the chassis and the panel.

BRIEF DESCRIPTION OF THE DRAWINGS

The invention will be more fully understood by the following detailed description when taken together with the accompanying drawings in which.

DESCRIPTION OF THE PREFERRED EMBODIMENT

Figure 1:
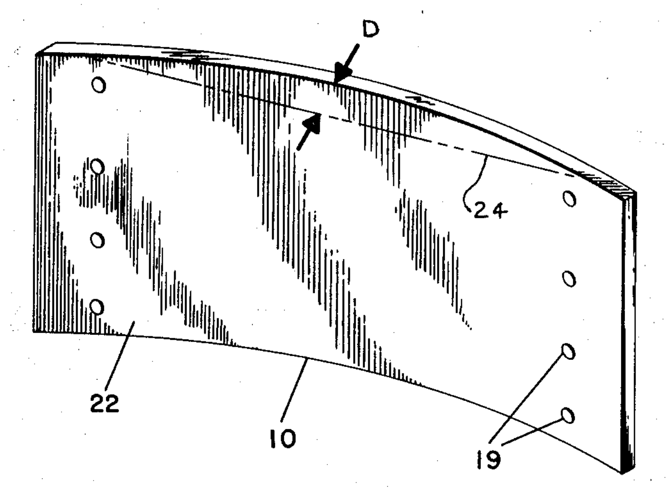
FIG. 1 is an isometric view of the outside surface of a bowed unattached panel for a radio-frequency shielded enclosure.

With continued reference to the accompanying figures, wherein like numerals designate similar parts, and with initial attention directed to FIG. 1, there is illustrated a panel 10 for a radio-frequency shielded enclosure. Panel 10 is bowed, for a reason which will be explained more fully later. Several attachment holes 19 in the sides of panel 10 may be used as points of attachment to a radio chassis (not shown in FIG. 1). Concave surface 22 of the panel becomes the outside surface of panel 10 when panel 10 is properly attached to a radio chassis (not shown).

In FIG. 1 is shown a chord 24 which represents an imaginary straight line which intersects the panel 10 at a pair of holes 19 located at opposite sides of panel 10. Also shown is a distance D, which is an imaginary perpendicular line from chord 24 to panel 10 at the point where this perpendicular distance is greatest. D represents the amount of bowing in the panel 10. D is determined, among other things, by the thickness of the panel 10 and the type of material of which panel 10 is made. In the practice of the invention, the amount of bowing required must be determined in advance, either by trial and error or by the use of engineering design criteria, so that a proper amount of force is needed to remove the arc, as will be explained hereinafter.

Figure 2:
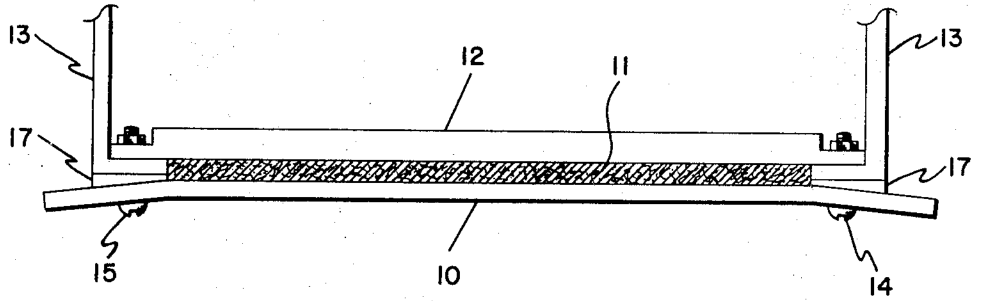
FIG. 2 is a top view of the panel of FIG. 1 securely attached to a chassis.

Looking now at FIG. 2, a top view of panel 10 is shown attached to a chassis 13. Panel 10 is also attached to crossbeam 12, which is in turn attached to chassis 13 by two bolts 14 and 15. RFI gasket 11 is mounted on crossbeam 12. When the panel 10 is securely attached to chassis 13 by bolts 14 and 15, as shown in FIG. 2, the arc shown in FIG. 1 is nearly removed. This removal of the arc is caused by the force exerted by the convex inside surface of panel 10 when bolts 14 and 15 are tightened and by the counterforce exerted by the surfaces of crossbeam 12 and by the RFI gasket 11 mounted on crossbeam 12. Provided the panel 10 has the proper amount of bowing put into it, as contemplated by the invention, fully tightening bolts 14 and 15 will balance the forces along the edges of panel 10. Therefore, the panel 10 will exert a uniform force on the RFI gasket 11. This uniform force on the RFI gasket 11 reduces electro-magnetic radiation along the joining surfaces to a low level.

The bow formed in the panel 10 can be accomplished by installing tapered shims 17 between panel 10 and chassis 13. Shims 17 will mechanically force panel 10 into a bowed condition. In addition, shims 17 provide an RFI seal between chassis 13 and panel 10.

Pre-bowing can also be accomplished by a rolling device, either during manufacturing or after it is cut and attachment holes 19 are punched. However there are numerous other ways to get the same pre-bowing effect in a panel, with the same end results.

From the foregoing it may be seen that applicant has invented both a novel method of reducing electric magnetic radiation from an enclosure and a novel device for carrying out the method. By first setting a proper amount of inward bow into an enclosure panel, the panel can be made to exert uniform pressure against isolation material and shims which are positioned between the chassis and the panel. Thus, electro-magnetic radiation is virtually eliminated from radio-frequency enclosures, without adding appreciably to the cost of manufacturing or to the thickness or weight of panels used with the enclosures.

What is claimed is:

1. A radio-frequency shielded enclosure comprising:

(a) a chassis having an enclosure opening;

(b) at least one thin chassis panel for covering said opening;

(c) attaching means fastening each said panel to said chassis at a plurality of points along both sides of each said panel;

(d) an electro-magnetic isolation material, for electro-magnetic isolation of the top and bottom portions of each said panel;

(e) a pair of shims for each said panel, said shims being substantially the same length as the height of said panel and being flat on one side and tapered on the other side, so that their outer edge is thicker than their inner edge, said shims being inserted between the attached sides of said panel and said chassis mechanically forcing the sides of said panel outward and bowing the middle of said panel inward providing a good surface contact along the sides of said panel preventing electro-magnetic radiation leakage therebetween;

(f) at least one crossbeam, the ends of each said crossbeam being attached to opposite sides of said chassis by said attaching means, said electro-magnetic isolation material being mounted on said crossbeam, said inward bowing of said thin panel being sufficient to overcome the natural tendency of the said panel to bow outward, thereby providing uniform contact pressure between said isolation material and said top and bottom of each said panel.

2. In a radio-frequency shielded enclosure having a chassis, at least one crossbeam mounted on said chassis, at least one thin panel covering an opening in said enclosure, and electron-magnetic isolation material mounted on each said crossbeam, the improvement comprising shims, said shims being tapered so as to be thicker at their outer edge than at their inner edge, said shims being substantially the same length as the height of said panel and being flat on their side adjacent to said chassis and tapered on their other side, adjacent to said panel, said shims being inserted between the attached sides of said panel and said chassis mechanically forcing the sides of said panel outward and bowing the middle of said panel inward providing a good surface contact along the sides of said panel to prevent electro-magnetic radiation leakage therebetween, said inward bowing of said panel being sufficient to overcome the natural tendency of said panel to bow outward, thereby providing uniform contact pressure between said isolation material and said top and bottom of each said panel.

References Cited

UNITED STATES PATENTS

| | | | |
|---|---|---|---|
| 2,272,178 | 2/1942 | McDowell et al. | 220—308 XR |
| 3,240,862 | 3/1966 | Merkl et al. | |

DARRELL L. CLAY, Primary Examiner

U.S. Cl. X.R.

312—257